(12) United States Patent
Lam

(10) Patent No.: US 9,893,330 B2
(45) Date of Patent: Feb. 13, 2018

(54) BATTERY BOX BODY FOR LIGHT-FIXTURE

(71) Applicant: Jiangmen Hongsen Electronic Lighting Co., Ltd., Jiangmen, Guangdong (CN)

(72) Inventor: Su Io Lam, Jiangmen (CN)

(73) Assignee: JIANGMEN HONGSEN ELECTRONIC LIGHTING CO., LTD., Jiangmen, Guangdong (CN)

( * ) Notice: Subject to any disclaimer, the term of this patent is extended or adjusted under 35 U.S.C. 154(b) by 47 days.

(21) Appl. No.: 15/206,006

(22) Filed: Jul. 8, 2016

(65) Prior Publication Data

US 2018/0013108 A1   Jan. 11, 2018

(51) Int. Cl.
*H01M 2/10*   (2006.01)
*H01M 10/42*   (2006.01)

(52) U.S. Cl.
CPC ....... *H01M 2/1022* (2013.01); *H01M 10/425* (2013.01)

(58) Field of Classification Search
CPC .................. H01M 2/1022; H01M 10/425
See application file for complete search history.

(56) References Cited

U.S. PATENT DOCUMENTS

| | | | |
|---|---|---|---|
| 9,048,506 B2* | 6/2015 | Song .................. | H01M 2/0275 |
| 2005/0189912 A1* | 9/2005 | Jeon .................... | H01M 2/0285 320/112 |
| 2011/0244276 A1* | 10/2011 | Takeshita ............ | H01M 2/0217 429/7 |
| 2013/0330576 A1* | 12/2013 | Kolden ............... | H01M 10/425 429/7 |
| 2014/0004390 A1* | 1/2014 | Nishida .................. | H01M 2/22 429/7 |

* cited by examiner

*Primary Examiner* — Stewart Fraser
(74) *Attorney, Agent, or Firm* — King & Schickli, PLLC

(57) ABSTRACT

The invention discloses a battery box body for a light-fixture which comprises a battery box, wherein the battery box is provided with a battery compartment, a circuit board compartment as well as a battery cover and a circuit board cover which hermetically cover the battery compartment and the circuit board compartment in a matching manner, respectively. A recess capable of avoiding and accommodating a light-fixture is arranged in the outer wall of the battery box in an inwardly concave manner. The battery box structure can be matched and combined with a strip-like light-fixture in use, and the recess on the outer wall of the battery box structure can correspondingly accommodate the light-fixture, so that the battery box and the light-fixture are matched with each other and hung on the wall.

10 Claims, 3 Drawing Sheets

BATTERY BOX BODY FOR LIGHT-FIXTURE

FIELD OF THE INVENTION

The invention relates to a battery box body for a light-fixture.

BACKGROUND OF THE INVENTION

Light-fixtures are lamps which are often used in festivals in nowadays. People give their originality to design the lamps to be in shapes or appearances which are quite similar to objects with festival characteristics, elements, etc., so as to foil the festive atmosphere. Moreover, due to different using requirements for use safety and outdoor use, the light-fixtures often need to be matched with dry batteries for direct-current drive. For instance, Christmas light-fixtures are the most common ones. The Christmas light-fixtures in the market have many different object-imitating models with different shapes, so that the light-fixtures need to be provided with the battery box correspondingly so as to mount batteries and connect wires. Therefore, the battery box must be designed to be capable of matching with the characteristics of special shapes of the light-fixtures such that the battery box does not affect mounting and fixation of the light-fixtures, and meanwhile convenience of change as well as waterproof sealing property and durability of the batteries are also guaranteed.

With respect to the strip-like light-fixture with relatively large front and back width, as the battery box and the light-fixture are placed in a combined manner, the battery box must be placed between the light-fixture and the wall body, so as to hide the battery box and prevent the long wires between the battery box and the light-fixture from leading out. With respect to a common battery box structure in an ordinary shape, the light-fixture is uplifted ponderously due to the integrally bulged shape, so that the strip-like light-fixture cannot be conveniently placed against the wall vertically.

SUMMARY OF THE INVENTION

In order to overcome the shortcomings of the prior art, the invention provides a battery box body for a light-fixture which can be well placed while matching with the light-fixture and is convenient to use.

The technical scheme provided by the invention to solve the technical problems is as follows:

A battery box body for a light-fixture comprises a battery box, wherein the battery box is provided with a battery compartment, a circuit board compartment as well as a battery cover and a circuit board cover which hermetically cover the battery compartment and the circuit board compartment in a matching manner, respectively. A recess capable of avoiding and accommodating the light-fixture is arranged in an outer wall of the battery box in an inwardly concave manner. The battery cover and the battery compartment can be quickly locked in an openable and closeable manner. The circuit board cover and the circuit board compartment can be buckled detachably.

As an improvement to the technical scheme, the battery cover and the battery compartment may be detachably articulated at one side; corresponding clamping hooks and clamping parts are arranged at the other sides of the battery cover and the battery compartment, respectively; the clamping hooks are fixedly connected to the battery cover in a rotatable manner; and the clamping hooks and the clamping parts are respectively provided with interlocked micro-bump parts at clamping positions.

As a further improvement to the technical scheme, the clamping hooks are T-shaped, upper ends of the clamping hooks are transverse shaft bodies, and the battery cover is provided with articulating seats corresponding to the shaft bodies at the upper ends of the detachably mounted clamping hooks.

Further, articulating columns are arranged at one side, at which the battery cover and the battery compartment are detachably articulated, and articulating buckles which are detachable in a matching manner and are movably buckled with the articulating columns are arranged on the outer wall of the battery compartment.

Further, the circuit board cover is provided with buckle lugs which extend toward the outer wall of the circuit board compartment, and buckle plates corresponding to the buckle lugs are arranged on the outer wall of the circuit board compartment in a protruding manner.

Further, the circuit board cover or the circuit board compartment is provided with a fixing seat for fastening wires, the fixing seat is provided with a notch for accommodating the wires, and pressure levers are mounted on the fixing seat in a matching manner.

Further, a concave wire outlet is formed at the edge of the wall of the circuit board compartment opposite to the circuit board cover, a pressure head and a pressure pad are mounted in the wire outlet, and the pressure head and the pressure pad abut against each other up and down to hermetically wrap the wires.

Further, the pressure head is provided with a lug boss abutting against the pressure pad, and a notch capable of accommodating the wires is concavely formed in the surface of the pressure pad abutting against the pressure head.

Further, a positioning column is arranged on the wire outlet of the circuit board compartment, an insertion hole corresponding to the positioning column is formed in the pressure pad, and moreover, a groove which correspondingly covers the edge of the wire outlet is formed at the edge of the pressure pad, and a groove which correspondingly covers the edge of the circuit board cover is also formed in the pressure head.

Further, the circuit board compartment is arranged at the lateral side of the battery box, the circuit board cover is correspondingly the side wall of the battery cover, and the recess is vertically located in the middle of the battery compartment, and seal rings are mounted on the inner sides of the edges of the battery cover and the circuit board cover.

The battery box body for the light-fixture provided by the invention has the benefits that: the battery box structure can be matched and combined with a strip-like light-fixture for use, and the recess in the outer wall of the battery box structure can correspondingly accommodate the light-fixture, so that the battery box and the light-fixture are matched with each other and hung on the wall in a combined manner, and the battery box is easier to hide and does not affect fixation of the light-fixture. Besides, the battery cover is convenient to mount and use and good in sealing property and durability, and provides better assorted application for the light-fixture.

DETAILED DESCRIPTION OF THE EMBODIMENTS

Figure 1:
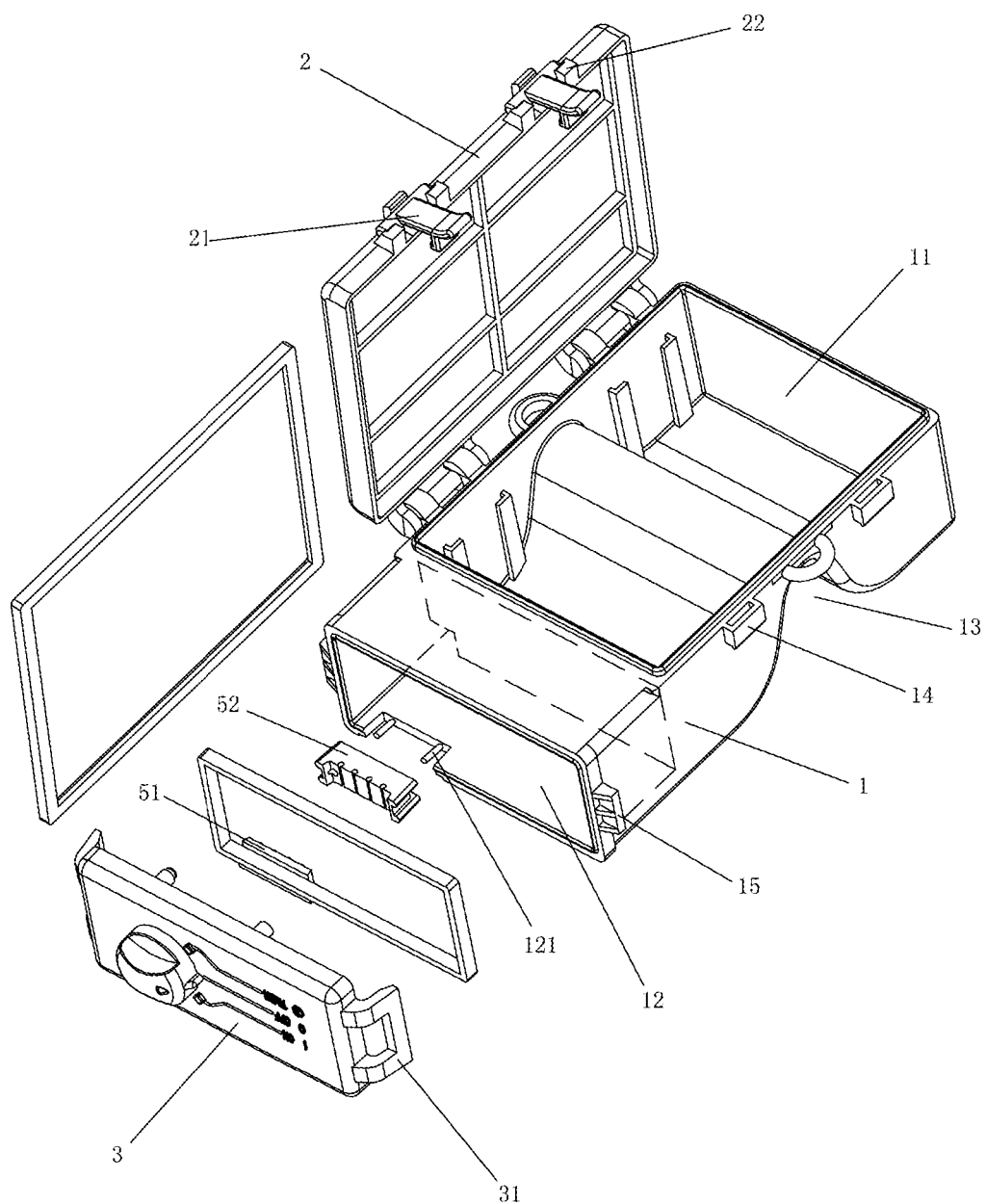
FIG. 1 is an exploded schematic diagram of a mounting structure of an embodiment of the invention.
Figure 2:
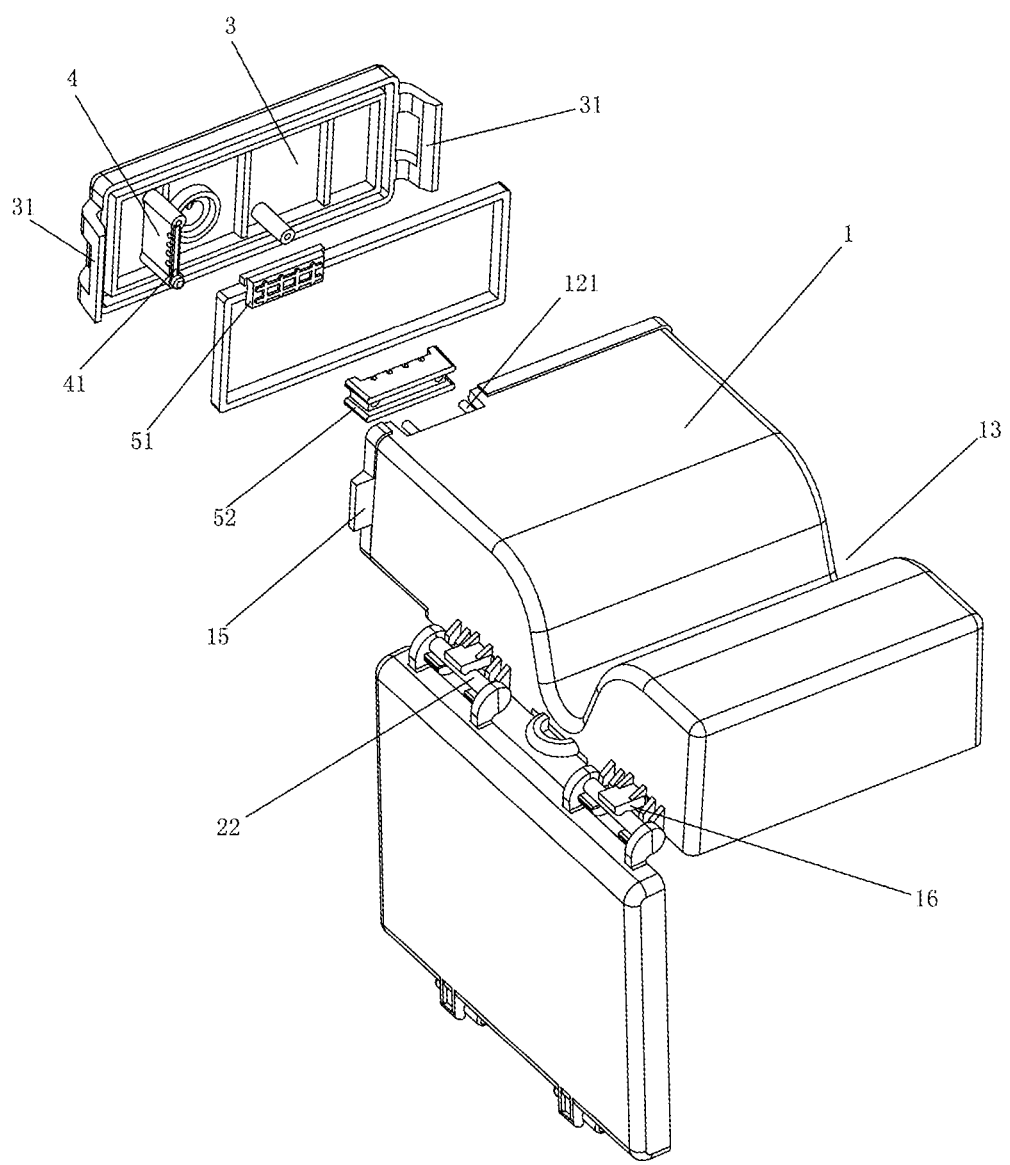
FIG. 2 is an exploded schematic diagram of the mounting structure of an embodiment of the invention from another point of view.
Figure 3:
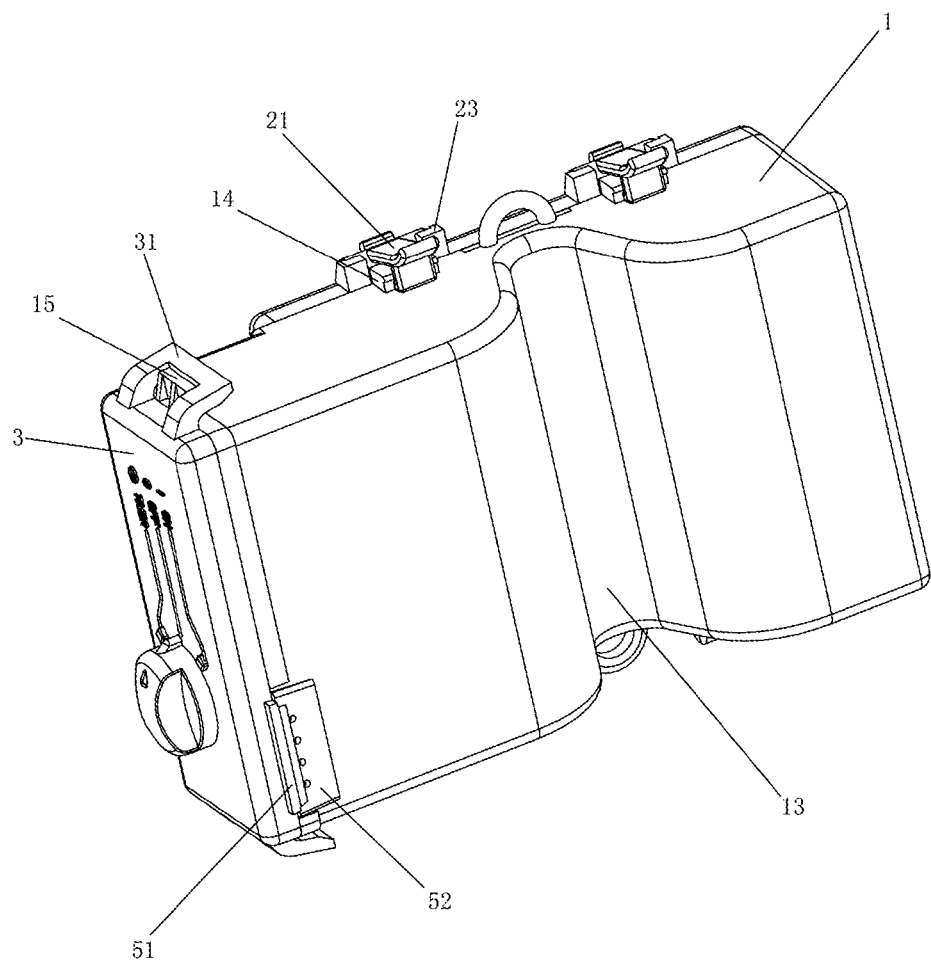
FIG. 3 is a schematic diagram of the mounting structure of the embodiment shown in FIG. 1.

With reference to FIG. 1-3, the invention provides a battery box body for a light-fixture, which comprises a rectangular battery box 1, wherein the battery box 1 is provided with a battery compartment 11, a circuit board compartment 12 as well as a battery cover 2 and a circuit board cover 4 which hermetically cover the battery compartment 11 and the circuit board compartment 12 in a matching manner, respectively. A box body wall is formed between the battery compartment 11 and the circuit board compartment 12 for separation, and the battery compartment 11 and the circuit board compartment 12 are communicated through a small hole or an opening, or are communicated directly with no wall located inside the box body. A recess 13 capable of avoiding and accommodating a light-fixture is arranged in an outer wall of the battery box 1 in an inwardly concave manner. The recess 13 is located in the middle of the box body, and sinks toward the battery compartment 11 from outside and separates the space of the battery compartment 11. Batteries are separately placed inside, correspondingly, thereby not only ensuring an overall symmetry of the battery box body, but also ensuring balance of weight along the left and right sides of the recess 13. The battery cover 2 and the battery compartment 11 may be quickly locked in an openable and closeable manner. The circuit board cover 3 and the circuit board compartment 12 can be buckled detachably, and seal rings can be mounted on the inner sides of the edges of the battery cover 2 and the circuit board cover 3. For example, it is not necessary to mount the seal rings if the battery box body is used indoor; on the contrary, it is necessary to mount the seal rings if the battery box body is used outside. A driving circuit board of the light-fixture is mounted in the circuit board compartment 12. The circuit board is electrically connected with the batteries in the battery compartment 11 through wires in the box body. Meanwhile, the circuit board hermetically extends out of the box body through the wires and is electrically connected with the light-fixture. Both the battery cover 2 and the circuit board cover 3 can be rapidly covered. The battery cover 2 can be opened and closed flexibly, so that replacement of the batteries is further facilitated.

As shown in FIGS. 1 and 2, the battery cover 2 and the battery compartment 11 are detachably articulated at one side; corresponding clamping hooks 21 and clamping parts 14 are arranged at the other sides of the battery cover 2 and the battery compartment 11, respectively; the clamping hooks 21 are fixedly connected to the battery cover 2 in a rotatable manner; the clamping hooks 21 and the clamping parts 14 are respectively provided with interlocked microbump parts at clamping positions The battery cover 2 flexibly covers the battery compartment 11 in a rotatable manner through articulation, and meanwhile, the clamping hooks 21 rotate to be locked and connected with the clamping parts 14 so as to lock the battery cover 2, so that the opening and closing operation is quite rapid and convenient.

Preferably, with reference to FIG. 1, the clamping hooks 21 are T-shaped, the upper ends of the clamping hooks are transverse shaft bodies, and the battery cover 2 is provided with articulating seats 23 corresponding to the shaft bodies at the upper ends of the detachably mounted clamping hooks 21, the articulating seats 23 are provided with semi-open type triangle three-point clamping buckles to buckle the shaft bodies of the clamping hooks 21, and the semi-open type fixing structure enables the clamping hooks 21 to be embedded in the articulating seats 23 easily, so that the mounting is quiet convenient. With reference to FIG. 2, articulating columns 22 are arranged at one side, at which the battery cover 2 and the battery compartment 22 are detachably articulated, and articulating buckles 16 which are detachable in a matched manner and are movably buckled with the articulating columns 22 are arranged on the outer wall of the battery compartment 11. The articulating buckles 16 are provided with the three-point clamping buckles in an inverted triangle manner to buckle the articulating columns 22, and the semi-open type structure enables the articulating columns 22 to be embedded in the articulating buckles 16 easily.

As shown in FIG. 1-3, the circuit board cover 3 is provided with buckle lugs 31 which extend toward the outer wall of the circuit board compartment 12, and buckle plates 15 corresponding to the buckle lugs 31 are arranged on the outer wall of the circuit board compartment 12 in a protruding manner. Reinforcing ribs are arranged on the buckle plates 15. The buckle lug 31 which is respectively arranged on each side of the circuit board cover 3 is buckled with the corresponding buckle plate 15, respectively. The buckle lugs 31 perform buckling by instantaneous elastic deformation of the material, so that buckling by the buckle lugs 31 is more secure than common movable buckling.

Further, with reference to FIG. 2, the circuit board can be fixedly connected to the circuit board cover 3 or in the circuit board compartment 12, and a fixing seat 4 for fastening the wires is arranged in a mounting position of the circuit board cover 3 or the circuit board compartment 12 corresponding to the circuit board. In the embodiment shown in FIG. 2, the fixing seat 4 is preferably integrally formed with the circuit board cover 3, the fixing seat 4 is in a vertical plate shape and is provided with a notch for accommodating the wires, pressure levers 41 are mounted on the fixing seat 4 in a matching manner, and the pressure levers 41 are fixed through screws or in other ways and press the wires in the notch of the fixing seat 4, so that the wires can be effectively prevented from dropping off from the circuit board directly when being pulled by external force so as not to cause faults.

With reference to FIGS. 1 and 2, a concave wire outlet is formed at the edge of the wall of the circuit board compartment 12 opposite to the circuit board cover 3, a pressure head 51 and a pressure pad 51 are mounted in the wire outlet, and the pressure head 51 and the pressure pad 52 abut against each other up and down to hermetically wrap the wires; the pressure head 51 is provided with strip-like, #-shaped lug losses or lug losses in other shapes abutting against the pressure pad 52, and a notch capable of accommodating the wires is concavely formed in the surface, abutting against the pressure head, of the pressure pad 52; a positioning column 121 is arranged at the wire outlet of the circuit board compartment 12, an insertion hole corresponding to the positioning column 121 is arranged on the pressure pad 52, and moreover, a groove which correspondingly covers the edge of the wire outlet is formed at the edge of the pressure pad 52, and a groove which correspondingly covers the edge of the circuit board cover 3 is also formed in the pressure head 51; a sealing waterproof effect that the wires extend out of the box body can be effectively realized through the pressure head 51 and the pressure pad 52.

Further, if the seal rings are mounted on the battery cover 2 and the circuit board cover 3, grooves matching with the seal rings are arranged on the battery cover 2 and the circuit board cover 3, and raised lines abutting against the seal rings are arranged at the opening edges of the battery compartment 11 and the circuit board compartment 12 in a protruding manner. The pressure head 51 and the seal rings are integrally formed. The section of the seal ring on the battery cover 2 is L-shaped. The section of the seal ring on the circuit board cover 3 is designed rectangular. The seal rings, the pressure head 51 and the pressure pad 52 are made of flexible glue and silica gel. The seal rings are hidden on the inside of the battery cover 2, so that the influence on the overall appearance of the battery box 1 due to exposure is avoided, and the influence of the seal rings subjected to aging is further reduced. The circuit board cover 3 is provided with knobs for operating the light-fixture to switch on and off and control the light-fixture, buttons, a wireless controller or other control switches; the circuit board compartment 12 is arranged at the lateral side of the battery box 1, the opening of the circuit board compartment 12 is opposite to the lateral side of the battery box 1, that is, the circuit board cover 3 is correspondingly the side wall of the battery cover 1, and the circuit board cover 3 and the battery cover 2 are mutually perpendicular, and the battery cover 2 is the side of the battery box 1 facing the wall, the recess 13 is the side of the battery box 1 facing the light-fixture, and the circuit board cover 3 is located on the side wall, so that people can touch and hold the light-fixture battery box body to control the battery box body for the light-fixture in use. The battery compartment 11 is designed to hold even numbers of batteries, and the recess 13 vertically divides the battery compartment 11 symmetrically at left and right sides, so as to maintain balance of the battery box 1.

With reference to FIG. 3, a connecting ring for connection is further arranged on the outer wall of the battery box 1, so that the battery box is firmly connected with the wall body or the light-fixture. Reinforcing ribs are arranged on the inner sides of the battery cover 2 and the circuit board cover 3 so as to enhance the strength.

Above is only a preferred embodiment of the invention, and the invention is not limited thereto. Those achieving the technical effects of the invention using the same or any similar means shall all fall into the protection scope of the invention.

The invention claimed is:

1. A battery box body for a light-fixture, comprising a battery box, wherein the battery box is provided with a battery compartment, a circuit board compartment as well as a battery cover and a circuit board cover which hermetically cover the battery compartment and the circuit board compartment in a matched manner, respectively; a recess capable of avoiding and accommodating a light-fixture is arranged in an outer wall of the battery box in an inwardly concave manner; the battery cover and the battery compartment can be quickly locked in an openable and closeable manner; and the circuit board cover and the circuit board compartment can be buckled detachably.

2. The battery box body for the light-fixture according to claim 1, wherein the battery cover and the battery compartment are detachably articulated at one side; corresponding clamping hooks and clamping parts are arranged at the other side of the battery cover and the battery compartment, respectively; the clamping hooks are fixedly connected to the battery cover in a rotatable manner; the clamping hooks and the clamping parts are respectively provided with interlocked micro-bump parts at clamping positions.

3. The battery box body for the light-fixture according to claim 2, wherein the clamping hooks are T-shaped, wherein the upper ends of the clamping hooks are transverse shaft bodies, and the battery cover is provided with articulating seats corresponding to the shaft bodies at the upper ends of the detachably mounted clamping hooks.

4. The battery box body for the light-fixture according to claim 2, wherein articulating columns are arranged at one side, at which the battery cover and the battery compartment are detachably articulated, and articulating buckles which are detachable in a matched manner and are movably buckled with the articulating columns are arranged on the outer wall of the battery compartment.

5. The battery box body for the light-fixture according to claim 1, wherein the circuit board cover is provided with buckle lugs which extend toward the outer wall of the circuit board compartment, and buckle plates corresponding to the buckle lugs are arranged on the outer wall of the circuit board compartment in a protruding manner.

6. The battery box body for the light-fixture according to claim 1, wherein the circuit board cover or the circuit board compartment is provided with a fixing seat for fastening wires, the fixing seat is provided with a notch for accommodating the wires, and pressure levers are mounted on the fixing seat in a matching manner.

7. The battery box body for the light-fixture according to claim 1, wherein a concave wire outlet is formed at the edge of the wall of the circuit board compartment opposite to the circuit board cover, a pressure head and a pressure pad are mounted in the wire outlet, wherein the pressure head and the pressure pad abut against each other up and down to hermetically wrap wires.

8. The battery box body for the light-fixture according to claim 7, wherein the pressure head is provided with a bump part abutting against the pressure pad, and a notch capable of accommodating the wires is concavely formed in the surface of the pressure pad abutting against the pressure head.

9. The battery box body for the light-fixture according to claim 7, wherein a positioning column is arranged at the wire outlet of the circuit board compartment, an insertion hole corresponding to the positioning column is arranged on the pressure pad, and a groove which correspondingly covers the edge of the wire outlet is formed at the edge of the pressure pad, and a groove which correspondingly covers the edge of the circuit board cover is also formed in the pressure head.

10. The battery box body for the light-fixture according to claim 1, wherein the circuit board compartment is arranged at a lateral side of the battery box, the circuit board cover is correspondingly the side wall of the battery cover, and the recess is vertically located in the middle of the battery compartment, and seal rings are mounted on the inner sides at the edges of the battery cover and the circuit board cover.

* * * * *